United States Patent [19]

Hattori et al.

[11] Patent Number: 5,096,970

[45] Date of Patent: Mar. 17, 1992

[54] PREPOLYMERIZATION PROCESS FOR PRODUCING A CONJUGATED DIENE COMPOUND PREPOLYMER SOLUTION

[75] Inventors: Yasuo Hattori; Yuichi Kitagawa, both of Yokohama, Japan

[73] Assignee: Asahi Kasei Kogyo Kabushiki Kaisha, Osaka, Japan

[21] Appl. No.: 577,087

[22] Filed: Aug. 31, 1990

Related U.S. Application Data

[63] Continuation of Ser. No. 234,171, Aug. 19, 1988, abandoned.

[30] Foreign Application Priority Data

Aug. 19, 1987 [JP] Japan ................ 62-204277
Aug. 19, 1987 [JP] Japan ................ 62-204278

[51] Int. Cl.$^5$ ................ C08F 236/10; C08F 4/12
[52] U.S. Cl. ................ 525/268; 525/269; 525/316; 526/86; 526/114; 526/122; 526/133; 526/153; 526/157
[58] Field of Search ................ 525/268, 269; 526/86

[56] References Cited

U.S. PATENT DOCUMENTS

| | | | |
|---|---|---|---|
| 3,299,178 | 1/1967 | Short et al. | 525/268 |
| 3,644,587 | 2/1972 | Finberg | 525/243 |
| 4,429,089 | 1/1984 | Pedretti | 526/114 |
| 4,575,538 | 3/1986 | Hsieh . | |

FOREIGN PATENT DOCUMENTS

| | | |
|---|---|---|
| 0011184 | 5/1980 | European Pat. Off. . |
| 0091287 | 10/1983 | European Pat. Off. . |
| 60-23406 | 2/1985 | Japan . |
| 60-104111 | 6/1985 | Japan . |
| 60-104112 | 6/1985 | Japan . |
| 60-108407 | 6/1985 | Japan . |
| 60-108408 | 6/1985 | Japan . |
| 60-108410 | 6/1985 | Japan . |
| 2029426 | 3/1980 | United Kingdom . |
| 2161169 | 1/1986 | United Kingdom . |

OTHER PUBLICATIONS

Chemical Abstracts, vol. 103, 1985, No. 103:105820r, "Impact Modifiers for Styrene Polymers", p. 38.

*Primary Examiner*—John C. Bleutge
*Assistant Examiner*—Vasu S. Jagannathan
*Attorney, Agent, or Firm*—Birch, Stewart, Kolasch & Birch

[57] ABSTRACT

A conjugated diene compound prepolymer solution useful for the production of a vinyl aromatic compound high impact polymer material is produced by a process in which a prepolymerization mixture is prepared from 1 to 70 parts by weight of a conjugated diene compound and 30 to 99 parts by weight of a vinyl aromatic compound, and is prepolymerized at 0° C. to 150° C. in the presence of a prepolymerization catalyst which can cause the conjugated diene compound to be selectively polymerized but is substantially not effective for the polymerization of the vinyl aromatic compound to an extent such that the conjugated diene compound and the vinyl aromatic compound are prepolymerized at degrees of conversion of the conjugated diene compound at least 50% and 10% or less, respectively, and the resultant prepolymer solution is further polymerized by a radical or anionic polymerization method so that the vinyl aromatic compound is polymerized with the conjugated diene compound prepolymer.

22 Claims, No Drawings

PREPOLYMERIZATION PROCESS FOR PRODUCING A CONJUGATED DIENE COMPOUND PREPOLYMER SOLUTION

This application is a continuation of application Ser. No. 234,171, filed on Aug. 19, 1988, now abandoned.

BACKGROUND OF THE INVENTION

1. Field of the Invention

The present invention relates to a prepolymerization process for producing a conjugated diene compound prepolymer solution. More particularly, the present invention relates to a prepolymerization process for producing a conjugated diene compound prepolymer solution and a process for producing a vinyl aromatic compound high impact polymer material from the above-mentioned prepolymer solution.

2. Description of the Related Art

It is known that the impact resistance of vinyl aromatic hydrocarbon polymers, for example, styrene polymers, which are hard and fragile, can be improved by adding various types of toughening agents consisting of non-vulcanized rubber materials to the polymers. Particularly, high impact styrene polymers which have been produced by a bulk polymerization or bulk-suspension polymerization of a styrene compound monomer in the presence of a non-vulcanized rubber material are cheap have a high processability and various excellent physical properties, and thus are useful for various industries. The non-vulcanized rubber materials usable for the above-mentioned purpose are usually selected from butadiene polymers and styrene-butadiene copolymers. Especially, when a high impact property at a low temperature is required, various types of butadiene polymers, for example, low cis-polybutadiene rubbers produced by an anionic polymerization method in the presence of a catalyst consisting of an organic lithium compound either alone or comprising, the organic lithium compound as the major component, or high cis-polybutadiene rubbers produced by a polymerization method using a coordination catalyst comprising, as a principal component, a transition metal, for example, cobalt, nickel or titanium, are used as a toughening agent for various purposes.

The above-mentioned butadiene polymers and styrene-butadiene copolymers are produced by a polymerization process using an inert solvent, and are used as a toughening agent after the inert solvent is removed from the polymers or copolymers.

Also, in the production of a high impact vinyl aromatic hydrocarbon polymer, a toughening agent consisting of a rubber material is dissolved in a corresponding vinyl aromatic hydrocarbon monomer, for example, styrene monomer, and the resulting solution is subjected to a bulk or bulk-suspension polymerization process. The above-mentioned dissolving procedure requires much labor and an effective apparatus for evenly dissolving the rubber material in the monomer.

To eliminate the above-mentioned disadvantages, Japanese Unexamined Patent Publication (Kokai) No. 57-149316 and U.S. Pat. No. 4,311,819 disclose a process for producing a solution of a rubber-like butadiene prepolymer in a medium consisting of an vinyl aromatic hydrocarbon compound and then for producing a high impact butadiene-vinyl aromatic hydrocarbon copolymer from the prepolymer solution. This process is however, disadvantageous in that, since the butadiene is prepolymerized in the presence of a lithium-based catalyst in the vinyl aromatic hydrocarbon compound medium, the resultant butadiene prepolymer contains, in the prepolymer chains thereof, about 10% by weight or more of the vinyl aromatic hydrocarbon groups copolymerized with butadiene, and thus exhibit an unsatisfactory impact resistance, especially at a low temperature.

The above-mentioned process is also disadvantageous in that, to make the amount of the vinyl aromatic hydrocarbon compound, for example, styrene, copolymerized with butadiene in the butadiene prepolymer, it is necessary to either increase the ratio in the amount of butadiene to the vinyl aromatic hydrocarbon compound or to decrease the degree of the conversion of the butadiene to about 20%, and thus a large amount of non-polymerized butadiene must be removed from the prepolymerization system before the copolymerization process.

Japanese Examined Patent Publication (Kokoku) No. 41-6917 and U.S. Pat. No. 3,299,178 disclose a process for producing a high impact butadiene-vinyl aromatic compound copolymer in which butadiene is prepolymerized in the presence of a specific catalyst comprising an iodine-containing compound, for example, titanium tetraiodide and an organic metal compound in a vinyl aromatic compound medium. This process can provide a butadiene prepolymer, but is disadvantageous in that the prepolymerization rate of butadiene is extremely low, to an extent such that the conversion of butadiene at a degree of conversion of at least 50%, preferably at least 60%, is very difficult, and thus a large amount of non-prepolymerized butadiene must be removed from the prepolymerization system before the copolymerization step. Also, the above-mentioned process is disadvantageous in that the resultant copolymer exhibits a poor heat-degradation resistance, probably because the resultant copolymer contains a residue of the catalyst comprising the titanium compound and/or a derivative thereof.

Further, U.S. Pat. No. 4,575,538 discloses a process for producing a high impact butadiene-aromatic vinyl compound copolymer, in which, butadiene is prepolymerized in the presence of a specific catalyst composition comprising a rare earth metal halide-ligand complex (component A) formed by admixing a rare earth metal halide and an electron donor ligand and an organometal compound (component B). This specific catalyst has a low polymerization activity for butadiene in the vinyl aromatic compound medium, and therefore, it is very difficult to prepolymerize butadiene at a degree of conversion of at least 50%, preferably at least 60%, even when a large amount of the catalyst is used, and thus it is necessary to eliminate a large amount of non-prepolymerized butadiene from the prepolymerization system before the copolymerization step. Further the resultant copolymer from the above-mentioned process contains a large amount of gel-like polymeric substance which is insoluble in the vinyl aromatic compound medium, and thus exhibits a poor impact resistance and an uneven appearance.

SUMMARY OF THE INVENTION

An object of the present invention is to provide a prepolymerization process for producing a solution of a conjugated diene compound prepolymer dissolved in a vinyl aromatic compound medium useful for the production of a vinyl aromatic compound high impact polymer material from the prepolymer solution, while restricting the amount of the vinyl aromatic compound copolymerized with the conjugated diene compound and contained in the prepolymer to a level as low as possible, preferably to a level of substantially zero.

Another object of the present invention is to provide a prepolymerization process for producing a solution of a conjugated diene compound prepolymer dissolved in a vinyl aromatic compound medium, useful for the production of a vinyl aromatic compound high impact polymer material, in which process the conjugated diene compound is prepolymerized at a high degree of conversion and the vinyl aromatic compound is substantially not copolymerized with the conjugated diene compound.

Still another object of the present invention is to provide a prepolymerization process for producing a solution of a conjugated diene compound prepolymer dissolved in a vinyl aromatic compound medium, useful for the production of a vinyl aromatic compound high impact polymer material which substantially does not contain a gel-like polymer fraction and exhibits an excellent impact resistance and a high heat degradation resistance.

The above-mentioned objects can be attained by the process of the present invention, which comprises the steps of:

preparing a prepolymerization mixture comprising 1 to 70 parts by weight of at least one conjugated diene compound and 30 to 99 parts by weight of at least one vinyl aromatic compound; and subjecting the prepolymerization mixture to prepolymerization at a temperature of 0° C. to 150° C. in the presence of a prepolymerization catalyst which can cause the conjugated diene compound to be selectively polymerized but is substantially not effective for the polymerization of the vinyl aromatic compound, to an extent such that the conjugated diene compound and the vinyl aromatic compound are prepolymerized at degree of conversion of at least 50 molar% and 10 molar% or less, respectively, to form a conjugated diene compound prepolymer solution.

The resultant conjugated diene compound prepolymer solution is further subjected to a polymerization procedure in which the remaining vinyl aromatic compound is copolymerized with the conjugated diene compound prepolymer to provide a vinyl aromatic compound high impact polymer material. The polymerization is carried out by a radial or anionic polymerization method.

DESCRIPTION OF THE PREFERRED EMBODIMENTS

In the first step of the process of the present invention, a prepolymerization mixture is prepared from 1 to 70 parts by weight of a diene component consisting of at least one conjugated diene compound and 30 to 99 parts by weight or a vinyl component consisting of at least one vinyl aromatic compound.

The prepolymerization mixture may further contain a medium consisting of at least one inert solvent.

The inert solvent medium should be inert not only to the prepolymerization but also to the radical or anionic polymerizations, and preferably consists of at least one member selected from aliphatic hydrocarbons, for example, butane, pentane, hexane, isopentane, heptane, octane, and isooctane; cycloaliphatic hydrocarbons, for example, cyclopentane, methylcyclopentane, cyclohexane, methylcyclohexane, and ethylcyclohexane; and aromatic hydrocarbons, for example, benzene, toluene, ethylbenzene, and xylene.

The inert solvent medium is preferably used in an amount of 200 parts by weight or less, more preferably 100 parts by weight or less, still more preferably 50 parts by weight or less, per 100 parts by weight of the mixture of the diene component with the vinyl component.

The prepolymerization can be effected without using the inert solvent medium, and this is a preferred embodiment of the process of the present invention.

The conjugated diene compound usable for the present invention is a conjugated diolefin compound and is preferably selected from the group consisting of 1,3-butadiene, 2-methyl-1,3-butadiene (isoprene), 2,3-dimethyl-1,3-butadiene, 1,3-pentadiene and 1,3-hexadiene. Usually, the conjugated diene component consists of 1,3-butadiene or isoprene alone. The conjugated diene component may consists of one of the above-mentioned compounds or a mixture of two or more thereof.

The vinyl aromatic compound usable for the present invention is preferably selected from the group consisting of styrene, o-methyl styrene, p-methyl styrene, p-tert-butyl styrene, 1,3-dimethyl styrene, $\alpha$-methyl styrene, vinyl naphthalene and vinyl anthracene, but usually, the vinyl component consists of styrene alone. The vinyl component may consist of one of the above-mentioned compounds or a mixture of two or more thereof.

As stated above, the ratio in weight of the conjugated diene component to the vinyl component is 1 to 70 parts by weight to 99 to 30 parts by weight, preferably, 2 to 40 parts by weight to 98 to 60 parts by weight, more preferably 3 to 30 parts by weight to 97 to 70 parts by weight.

When the prepolymerization mixture contains an inert solvent, preferably ratio in the weight of the conjugated diene component to the vinyl component is in the range of from 4 to 18 parts by weight to 96 to 82 parts by weight, more preferably 5 to 15 parts by weight to 95 to 85 parts by weight.

In the second step of the process of the present invention, the prepolymerization mixture is subjected to a prepolymerization procedure at a temperature of from 0° C. to 150° C., preferably from 20° C. to 130° C., in the presence of a specific prepolymerization catalyst which can cause the conjugated diene compound to be selectively polymerized but is substantially not effective for the polymerization of the vinyl aromatic compound. The polymerization procedure is carried out to an extent such that the conjugated diene compound is prepolymerized at a degree of conversion of at least 50 molar%, preferably at least 70 molar% or more, more preferably 90 molar% or more, and the vinyl aromatic compound is polymerized or copolymerized with the conjugated diene compound at a degree of conversion of 10 molar% or less, preferably 5 molar% or less, more preferably 2 molar% or less.

The specific prepolymerization catalyst of the present invention comprises at least one member selected from the group consisting of:

(A) mixture of a component (a) consisting of at least one member selected from the group consisting of carboxylates, alcoholates, phenolates, organic and inorganic phosphates, phosphonate, phosphinates, phosphites phosphonites and phosphinites of rare earth elements, with a component (b) consisting of at least one organic aluminum compound, and a component (c) consisting of at least one Lewis acid, (B) mixtures of a component (d) consisting of at least one member selected from the group consisting of compounds of barium, strontium and calcium with a component (e) consisting of at least one member selected from the group consisting of organic compounds of lithium, magnesium, and lithium.-magnesium, and (C) mixtures of a component (g) consisting of at least one member selected from the group consisting of carboxylates, alcoholates, phenolates, organic or inorganic phosphates, phosphonates, phosphinates, phosphites, phosphonites and phosphinites of rare earth elements with a component (h) consisting of at least one organic magnesium compound.

In the component (a) of the catalytic mixture (A), the rare earth metal is preferably selected from the group consisting of cerium, lanthanam, praseodymium, neodymium and gadolinium.

Also, in the component (b) of the catalytic mixture (A), the organic aluminum compounds are represented by the general the formula (I):

$$AlR_{3-n}H_n \qquad (I)$$

wherein R represents a hydrocarbon radical having 1 to 8 carbon atoms and n represents zero or an integer of 1 or 2.

The Lewis acid in the component (c) of the catalytic mixture (A) is preferably selected from halogen-containing Lewis acids.

The above-mentioned type of catalyst consisting of the catalytic mixture (A) and a process for polymerizing 1,3-butadiene compound in the presence of the catalyst and without using the vinyl aromatic compound are disclosed in Japanese Unexamined Patent/ Publication (Kokai) No. 54-40890 corresponding to U.S. Pat. No. 4,429,089; Japanese Unexamined Patent Publication (Kokai) No. 55-66903 and corresponding European Unexamined Patent Publication No. 11184; German Unexamined Patent Publication No. 2,846,964; "Proceeding of China - US Bilateral Synposium on Polymer Chemistry and Physics", page 382, published on 1981; and Japanese Unexamined Patent Publication (Kokai) Nos. 60-108407 and 60-108408. Also Japanese Unexamined Patent Publication (Kokai) Nos. 60-104,112 and 60-108,410 discloses a process for the production of a high impact polystyrene polymer resin containing, as a toughening agent, the butadiene polymer produced by using the above-mentioned catalyst.

The catalytic mixture (A) usable for the specific catalyst of the present invention is disclosed in Japanese Unexamined Patent Publication (Kokai) No. 60-23406.

The catalytic mixture (B) usable for the specific catalyst of the present invention comprises a component (d) consisting of at least one member selected from compounds of barium, strontium, and calcium, and a component (e) consisting of at least one member selected from organo-lithium compounds, organomagnesium compounds, and organo-lithium-magnesium compounds.

Processes for producing butadiene polymers in the presence of catalyst similar to the catalytic mixture (B) in a large amount of a solvent are disclosed in Japanese Examined Patent Publication No. 52-30543 and the corresponding U.S. Pat. No. 4,080,492; Japanese Examined Patent Publication No. 52-48910 and the corresponding U.S. Pat. No. 3,846,385, and Japanese Unexamined Patent Publication No. 55-38827 and the corresponding U.S. Pat. No. 4,424,322. Also, the production of a high impact polystyrene resin by utilizing the butadiene polymers produced by the above-mentioned processes is disclosed in Japanese Unexamined Patent Publication No. 60-104,111.

The catalytic mixture (C) for the prepolymerization catalyst of the present invention comprises a component (g), which is the same as the component (a), and a component (h) consisting of at least one organomagnesium compound. In the component (g), the rare earth element is preferably selected from cerium, lanthanum, praseodymium, and neodymium.

The same type of catalysts as the catalytic mixture (C) are disclosed in Japanese Unexamined Patent Publication Nos. 61-97311 and 61-19611 and the corresponding U.K. Patent No. 2,161,169.

The most preferable prepolymerization catalyst for the process of the present invention comprises the catalytic mixture (A).

In the catalytic mixture (A), the component (a) consists of at least one member selected from carboxylates, alcoholates, phenolates, organic and inorganic phosphates, and organic and inorganic phosphites of rare earth elements, preferably cerium, lanthanum, praseodymium, neodymium and gadolinium. Most preferably, the rare earth element is neodymium, as this element can be easily obtained industrially at a low cost or a low price and is effective for providing a very active prepolymerization catalyst for the process of the present invention.

The component (a) may contain two or more different rare earth elements and may additionally contain a small amount of at least one metallic element other than the rare earth elements.

In the component (a), the preferable organic and inorganic phosphoric and phosphorous acids usable for forming the phosphates and phosphites of the rare earth elements are represented by the formulae (II) and (III), respectively

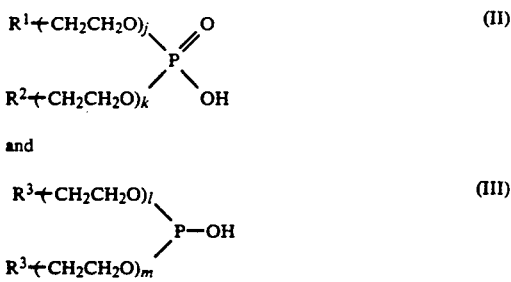

wherein j, k, l, and m respectively represented, independently from each other, zero or an integer of 1 or more, $R^1$, $R^2$ $R^3$ and $R^4$ respectively represent, independently from each other, a member selected from a hydrogen atom, aliphatic, cycloaliphatic and aromatic alkoxyl radicals and alkylphenoxyl radicals.

The organic and inorganic phosphoric acids of the formula (II) have a pentavalent phosphorous atom and can be in the form of mono- and di-esters thereof which are preferable for providing the rare earth element phosphates for the present invention.

The preferably phosphoric acid mono and di-esters are selected from phosphoric acid dibutyl ester, phosphoric acid dipentyl ester, phosphoric acid dihexyl ester, phosphoric acid diheptyl ester, phosphoric acid dioctyl ester, phosphoric acid bis(2-ethylhexyl)ester, phosphoric acid bis(1-methylheptyl)ester, phosphoric acid dilauryl ester, phosphoric acid dioleyl ester, phosphoric acid diphenyl ester, phosphoric acid bis(p-nonylphenyl)ester, phosphoric acid bis(polyethylene glycol-p-nonylphenol)ester, phosphoric acid (butyl)(2-ethylhexyl)ester, phosphoric acid (1-methylheptyl) (2-ethylhexyl)ester, and phosphoric acid (2-ethylhexyl)(p-nonylphenyl)ester.

The phosphoric acids usable for the present invention are preferably in the forms of inorganic and organic phosphoric acid monoesters. The phosphoric acid monoesters are preferably selected from 2-ethylhexylphosphonic acid monobutyl ester, 2-ethylhexylphosphoric acid mono-2-ethylhexyl ester, phenylphosphonic acid mono-2-ethylhexyl ester, 2-ethylhexyl-phosphonic acid mono-p-nonylphenyl ester, phosphonic mono-2-ethylhexyl ester, phosphoric acid mono-1-methylheptyl ester, and phosphoric acid mono-p-nonylphenyl ester.

The phosphoric acids are preferably selected from dibutyl phosphinic acid, bis(2-ethylhexyl) phosphinic acid, bis(1-methylheptyl)phosphinic acid, dilauryl phosphinic acid, dioleyl phosphinic acid, diphenyl phosphinic acid, bis(p-nonylphenyl)phosphinic acid, butyl(2-ethylhexyl)phosphinic acid, (2-ethylhexyl) (1-methylheptyl)phosphinic acid, (2-ethylhexyl) (p-nonylphenyl)phosphinic acid, 1-methylheptyl phosphinic acid, oleyl phosphinic acid, lauryl phosphinic acid, phenyl phosphinic acid, and p-nonylphenyl phosphinic acid.

The phosphorous acids of the formula (III) are preferably selected from phosphorous acid non- and di-esters corresponding to the above-mentioned phosphoric acid mono and di-esters. The phosphonous acids are preferably selected from phosphorous acid mono esters corresponding to the afore-mentioned organic phosphoric acid monoesters. Also, the phosphinous acids are preferably selected from organic phosphinous acids corresponding to the afore-mentioned organic phosphinic acids.

The salts of the rear earth elements with the organic and inorganic phosphoric, phosphonic, phosphinic, phosphorous, phosphonous and phosphinous acids have a variable solubility in the organic solvent and the vinyl aromatic compound in the prepolymerization mixture, depending on the type of the radicals represented by $R^1$, $R^2$, $R^3$ and $R^4$ and the number of the oxyethylene ($-CH_2CH_2O-$) radicals in the formulae (II) and (III). When the radicals $R^1$ to $R^4$ have a small molecular weight, the solubility of the resultant rare earth element salts in the organic solvent and the vinyl aromatic compound is small. Also, when the radicals $R^1$ to $R^4$ have an excessively large molecular weight, the solubility of the resultant rare earth element salts in the organic solvent and in the vinyl aromatic compound is also unsatisfactorily small.

When the radicals $R^1$ to $R^4$ are selected from isomeric hydrocarbon, alcoxyl, and alkylphenoxyl radicals, the larger the number of branches, the higher the solubility of the resultant rare earth element salts in the organic solvent and in the vinyl aromatic compound.

Also, when the organic phosphoric and phosphorous acids have one or two oxyethylene radicals, the larger the numbers (j, k, l, and m,) of the oxyethylene radicals, the smaller the solubility of the resultant rare earth element salts in the organic solvent and in the vinyl aromatic compound.

Also, the solubility of the rear earth element with the organic or inorganic phosphoric, phosphonic, phosphinic, phosphorous phosphonous and phosphinous acids in the organic solvent and in the vinyl aromatic compound is variable depending on the types of organic solvent and vinyl aromatic compound, and the other components for example, the Lewis acids in the component (C).

The preferable phosphoric, phosphonic and phosphinic, phosphorous, phosphonous and phosphinous acids for the present invention are selected from phosphoric acid bis-12-ethylhexyl)ester, phosphoric acid bis(1-methyl-heptyl)ester, phosphoric acid bis (p-nonylphenyl)ester, phosphoric acid bis(polyethylene glycol-p-nonylphenyl)ester, phosphoric acid (2-ethylhexyl) (p-nonylphenyl)ester, 2-ethylhexyl-phosphonic acid mono-2-ethylhexyl, 2-ethylhexyl-phosphonic acid mono-p-nonylphenyl ester, bis(2-ethylhexyl)phosphinic acid, bis(1-methylheptyl), phosphinic acid, bis(p-nonylphenyl) phosphinic acid, (2-ethylhexyl) (1-methylheptyl) phosphinic acid, (2-ethylhexyl) (p-nonylphenyl) phosphinic acid, phosphorous acid di-esters corresponding to the above-mentioned phosphoric acid diesters, organic phosphonous acid monoesters corresponding to the above-mentioned organic phosphonic acid monoesters, and organic phosphinous acids corresponding to the above-mentioned organic phosphinic acids.

The most preferable acids are phosphoric acid bis (2-ethylhexyl)ester, phosphoric acid bis(1-methylheptyl)ester, 2-ethylhexyl phosphonic acid mono-2-ethylhexyl ester bis(ethylhexyl) phosphinic acid, phosphorous acid bis(2-ethylhexyl)ester, phosphorous acid bis(1-methylheptyl)ester, 2-ethylhexyl phosphonous acid mono-2-ethylhexyl ester, and bis(ethylhexyl)phosphinous acid.

The salts of the rear earth elements with the organic and inorganic phosphoric, phosphonic, phosphinic, phosphorous, phosphonous, and phosphinous acids can be prepared by reacting chlorides of the rear earth elements with alkali metal salts of the above-mentioned acids.

In the catalytic mixture (A), the component (b) is preferably an organic aluminum compound, represented by general formula (I):

$$AlR_{3-n}H_n \qquad (I)$$

wherein n represents zero or an integer of 1 or 2, and R represents a hydrocarbon radical having 1 to 8 carbon atoms.

The aluminum compounds of the formula (I) preferably include trimethyl aluminum, triethyl aluminum, tri-isopropyl aluminum, tri-isobutyl aluminum, trihexyl aluminum, tricyclohexyl aluminum, diethyl aluminum hydride, diisobutyl aluminum hydride, ethyl aluminum dihydride, and isobutyl aluminum dihydride. Particularly preferable aluminum compounds are triethyl aluminum, tri-isobutyl aluminum, diethylaluminum hydride, diisobutyl aluminum hydride. The component (b) may consist of two or more different organic aluminum compounds.

In the catalytic mixture (A), the component (C) consists of at least one Lewis acid preferably a halogen-containing Lewis acid.

The Lewis acid is preferably selected from halides of elements of Group IIIa, IVa and Va in the Periodic Table and organic metal halides, and the halogen included in the Lewis acid is preferably chlorine or bromine.

The halogen-containing Lewis acid is preferably selected from methyl aluminum dibromide, methyl aluminum dichloride ethylaluminum dibromide, ethyl aluminum dichloride, butyl aluminum dibromide butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, dibutyl tin dichloride aluminum tribromide, antimony trichloride, antimony pentachloride, trichlorophosphorus, pentachlorophosphorus, and tin tetrachloride. Particularly preferable halogen-containing Lewis acids are diethyl aluminum chloride, ethyl aluminum sesquichloride, ethyl dichloride, diethyl aluminum bromide, ethyl aluminum sesquibromide and ethyl aluminum dibromide.

The prepolymerization catalyst comprising catalytic mixture (A) exhibits an extremely high catalytic activity and is used in an amount of $0.5 \times 10^{-3}$ moles or less, preferably from $0.015 \times 10^{-3}$ to $0.3 \times 10^{-3}$ moles in terms of the rare earth element per 100 g of the conjugated diene compound in the prepolymerization mixture. In the process of the present invention, it is unnecessary to use the catalyst comprising the catalytic mixture (A) in a large amount of more than $0.5 \times 10^{-3}$ moles in terms of the rear earth element per 100 g of the conjugated diene compound. An excessive amount of the catalyst in the prepolymerization mixture causes an amount of residue of the rear earth element containing catalyst remaining in the resultant conjugated diene compound prepolymer to be undesirably large, and is economically disadvantageous.

The catalyst comprising the catalytic mixture (A) is effective in the above-mentioned very small amount for producing the conjugated diene compound prepolymer containing a very small or substantially no residue of the catalyst, so that an ash-removing procedure is not necessary for the prepolymer.

In the catalytic mixture (A) wherein the Lewis acid in the component (C) contains halogen, the molar ratio of the component (C) in terms of halogen to the component (a) in terms of the rear earth element is preferably in the range of from 2:1 to 6:1.

Also, in the catalytic mixture (A), preferably the components (b) and (c) are in amounts of 2 to 100 molar parts, preferably 5 to 50 molar parts, in terms of aluminum and 2 to 6 molar parts, preferably 2.5 to 5 molar parts, in terms of halogen per one molar part in terms of rare earth element, of the component (a), respectively.

When comprised of the components (a), (b) and (c) in the amounts mentioned above, the resultant catalyst exhibits an excellent catalytic activity and the resultant conjugated diene compound prepolymer exhibits a very sharp molecular weight distribution diagram.

The catalytic mixture (A) preferably comprises a mixture of a preliminary reaction product of the component (a) with the component (b), with the component (c). The preliminary reaction of the component (a) with the component (b) is carried out in the presence or absence of the conjugated diene compound before mixing with the component (c). In this reaction, the component (a) preferably comprises at least one organic phosphoric acid salt of the rare earth element and the component (b) comprises at least one organic aluminum compound or organic aluminum halide compound.

Also, the component c to be mixed with the preliminary reaction product of the component (a) with the component (c) comprises at least one halogen-containing Lewis acid.

The preliminary reaction is preferably carried out at a temperature of from 0° C. to 100° C., more preferably from 20° C. to 80° C. When the reaction temperature is less than 0° C., the degree of reaction is sometimes unsatisfactory. Also, when the reaction temperature is more than 100° C., the resultant conjugated diene compound prepolymer sometimes exhibits an unsatisfactory spread molecular weight distribution diagram.

The preliminary reaction time is preferably in a range of from 0.01 to 10 hours, more preferably 0.05 to 5 hours. When the reaction time is less than 0.01 hour, the degree of reaction is sometimes unsatisfactory, and it is sometimes difficult to produce a conjugated diene compound prepolymer which exhibits a high activity and a sharp molecular weight distribution diagram. Also, when the reaction time is more than 10 hours, the resultant prepolymer sometimes exhibits an unsatisfactory activity.

Preferably, the catalytic mixture (A) is prepared by preliminarily reacting the component (a) with the component (b) in the presence of a conjugated diene compound, and by aging the reaction product. In the reaction and aging, the molar ratio of the conjugated diene compound to the rare earth element in the component (a) is preferably in the range of 1:1 to 1000:1, more preferably from 5:1 to 200:1. When the molar ratio is less than 1:1, not only the increase in prepolymerization activity of the resultant catalyst unsatisfactory but also the resultant conjugated diene compound prepolymer exhibits an unsatisfactorily broad molecular weight distribution. A molar ratio of more than 1000:1 is unnecessary and results in a very rapid prepolymerization of the conjugated diene compound, and thus in an increased difficulty in the control of the reaction temperature.

A preferable preliminary reaction and aging are carried out at a temperature of 0° C. to 100° C., more preferably 20° C. to 80° C. for a time of 0.01 to 24 hours, more preferably 0.05 to 5 hours. When the preliminary reaction and aging are carried out under conditions other than the above-mentioned conditions, the effects of the reaction and aging are sometimes unsatisfactory and the resultant conjugated diene compound prepolymer sometimes exhibits an excessively broad molecular weight distribution.

The catalytic mixture (B) usable for the prepolymerization catalyst comprises a component (d) consisting of at least one member selected from compounds of barium, strontium and calcium with a component (e) consisting of at least one member selected from the group consisting of organo lithium compounds, organo magnesium compounds and organo lithium-magnesium compounds.

The compounds of barium, strontium and calcium are preferably selected from those of the formulae (IV), (V), (VI) and (VII):

and

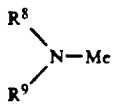

$$\begin{matrix} R^8 \\ \phantom{R}\diagdown \\ \phantom{RR}N-Me \\ \phantom{R}\diagup \\ R^9 \end{matrix} \quad (VII)$$

wherein $R^5$, $R^6$, $R^7$, $R^8$ and $R^9$ are respectively represent, independently from each other, a member selected from aliphatic, cycloaliphatic and aromatic hydrocarbon radicals, Y represents a member selected from oxygen and sulfur atoms, Me represents a member selected from barium, strontium, and calcium atoms, and x and y, respectively, represent, independently from each other, an integer of 1 to 4.

Also, the component (d) preferably consists of at least one member selected from compounds of barium, strontium and calcium with ethyl alcohol, n-propyl alcohol, isopropyl alcohol, tert-butyl alcohol, n-hexyl alcohol, cyclohexyl alcohol, allyl alcohol, cyclopentenyl alcohol, benzyl alcohol, phenol, catechol, 1-naphthol, 2,6-di-tert-butyl phenol, 2,4,5-tri-tert-butyl phenol, nonyl phenol, 4-phenyl phenol, ethane thiol, 1-butane thiol, thiophenol, cyclohexane thiol, 2-naphthalene thiol, caprylic acid, lauric acid, myristic acid, stearic acid, oleic acid, linoleic acid, linolenic acid, naphthoic acid, benzoic acid, hexanedioic acid, decandioic acid, tridecane thonolic acid, thiobenzoic acid, acid tert-butyl carbonate, acid hexyl carbonate, acid phenyl carbonate, acid tert-butyl thiocarbonate, dimethylamine, diethylamine, acid di-n-butylamine.

In the component (e), the organolithium compound is preferably selected from ethyl lithium, n-propyl lithium, isopropyl lithium, n-butyl lithium, isoamyl lithium, sec-amyl lithium, n-hexyl lithium, n-octyl lithium, allyl lithium, n-propenyl lithium, isobutyl lithium, benzyl lithium, phenyl lithium, 1,1-diphenyl lithium, tetramethylene dilithium, pentamethylene dilithium, hexamethylene dilithium, diphenylethylene dilithium, tetraphenylethylene dilithium, 1,5-dilithium naphthalene, 1,4-dilithium cyclohexane, polybutadienyl lithium, polyisobutenyl lithium, and polystyryl lithium.

Also, the organomagnesium compounds include, for example, diethyl magnesium, di-n-propyl magnesium, di-isopropyl magnesium, di-n-butyl magnesium, di-tert-butyl magnesium, di-n-hexyl magnesium, di-n-propenyl magnesium, diphenyl magnesium, ethyl magnesium chloride, n-propenyl magnesium chloride, isopropyl magnesium chloride, n-butyl magnesium chloride, n-butyl magnesium bromide, tert-butyl magnesium chloride, n-propenyl magnesium bromide, and phenyl magnesium chloride.

Further, the organolithium-magnesium compounds can be produced by reacting the above-mentioned organolithium compounds with the above-mentioned organomagnesium compounds.

The catalytic mixture (B) may contain an additional component (f) consisting of at least one member selected from organoaluminum compounds and organozinc compounds, in addition to the components (d) and (e). The additional component (f) sometimes serves as a polymerization initiator. Especially, where the prepolymerization mixture contains a small amount of impurities, for example, water, oxygen, ether, or various olefins or allene compounds, the additional component (f) later serves as an effective initiator.

The organoaluminum compounds and organozinc compounds usable for the additional component (f) include, for example, triethyl aluminum, tri-isobutyl aluminum, diethyl aluminum chloride, diethyl aluminum hydride, dibutyl aluminum hydride, diethyl zinc, and di-n-butyl zinc.

In the catalytic mixture (B), preferably the component (d) is in an amount of 0.005 to 5.0 m moles per 100 g of the conjugated diene compound (the diene component), and the component (e) is in an amount of 0.1 to 10 moles per mole of the component (d). Also, the additional component (f) is preferably in an amount of 10 m moles or less per 100 g of the conjugated diene compound.

The catalytic mixture (C) for the prepolymerization catalyst comprises component (g) consisting of at least one member selected from carboxylates, alcoholates, phenolates and organic and inorganic phosphates, phosphonates, phosphinates, phosphites, phosphonites, and phosphinites of rare earth elements with a component (h) consisting of at least one organomagnesium compound. The component (g) is the same as component (a) in the catalytic mixture (A). The organomagnesium compound in the component (h) is the same as that usable for the component (e) in the catalytic mixture (B).

In the catalytic (C), preferably the components (g) and (h) are in amounts of 0.01 to 1 m mole, more preferably 0.05 to 0.6 m moles and 0.02 to 10 m moles, more preferably 0.1 to 6 m moles, per 100 g of the conjugated diene compound, respectively.

Where the amount of the component (h) is excessively small in comparison to the amount of the rare earth element in the component (g), the resultant catalytic mixture (C) sometimes exhibits a decreased catalytic prepolymerization activity and the resultant conjugated diene compound prepolymer contains an excessively small amount of trans-structure and exhibits an undesirably spread molecular weight distribution diagram.

Where the amount of the component (h) is excessively large, in view of the content of the component (g), although the resultant conjugated diene compound prepolymer exhibits a sharp molecular weight distribution diagram, the prepolymer exhibits an unsatisfactorily decreased polymerization activity and has a decreased content of the trans-structure.

When the catalyst comprising the catalytic mixture (C) is used in an excessively large amount, not only does the resultant prepolymer contain an excessively large amount of residue of the catalyst but also the prepolymerization is costly and economically disadvantageous.

Usually, the weight ratio of the component (g) to the component (h) is in the range of from 1:0.1 to 1:50, preferably from 1:0.5 to 1:10.

The catalytic mixture (C) may contain an additional component (i) consisting of at least one member selected from organolithium compounds which are the same as those usable for the component (e) in the catalytic mixture (B), organoaluminum compounds which are the same as those usable for the component (b) in the catalytic mixture (A), and electron-donatine compounds, for example, tetrahydrofuran, diemthylether, and tetramethylene diamine. Usually, where the additional component (i) is contained in an amount of 10 molar% or more based on the molar amount of the component (h), the resultant catalyst exhibits an enhanced catalytic activity.

In the process of the present invention, the prepolymerization mixture comprising the diene component and the vinyl component is subjected to a prepolymerization procedure in the presence of the above-mentioned catalyst at a temperature of from 0° C. to 150° C., preferably from 20° C. to 130° C., more preferably from 50° C. to 120° C., still more preferably from 60° C. to 110° C. The prepolymerization procedure is effected to an extent such that the conjugated diene compound is prepolymerized at a large degree of conversion of at least 50 molar%, preferably at least 70 molar%, more preferably at least 90 molar%, and the vinyl aromatic compound is polymerized at a small degree of conversion of 10 molar% or lower, preferably 5 molar% or lower, more preferably 2 molar% or lower.

If the conversion degree of the conjugated diene compound is lower than 50%, the remaining conjugated diene compound must be separated and removed from the prepolymerized mixture before the copolymerization procedure. The separating and removing procedure requires a large amount of energy and is costly and economically disadvantageous.

If the conversion degree of the vinyl aromatic compound is higher than 10 molar%, the resultant copolymer exhibits an undesirably high glass transition temperature (Tg), which causes a decreased impact resistance of the resultant copolymer.

If necessary, before the polymerization procedure, excessive amounts of the conjugated diene compound, the vinyl aromatic compound, and optionally, the inert solvent, are removed from the prepolymerized mixture to provide a polymerization mixture.

Also, if necessary, an additional amount of the vinyl aromatic compound to provide a polymerization mixture is added to the resultant prepolymerized mixture.

Further, if necessary, the resultant prepolymerized mixture is diluted with a necessary amount of an insert solvent into a predetermined concentration of the prepolymer to provide a polymerization mixture.

The polymerization mixture containing the conjugated diene compound prepolymer solution in the vinyl aromatic compound is further subjected to a copolymerization procedure in which the vinyl aromatic compound is polymerized with the conjugated diene compound prepolymer to provide a vinyl aromatic polymer high impact polymer material. This polymerization procedure can be carried out by a radical polymerization method or an anionic polymerization method.

Where the polymerization is non-catalytically carried out by the radical polymerization method, without using an initiator, the polymerization mixture is heated at a temperature of 50° C. to 250° C.

Alternatively, where the polymerization is catalytically carried out by the radical polymerization method in the presence of an initiator, the polymerization mixture is maintained at a predetermined polymerization temperature of from 20° C. to 200° C. corresponding to the decomposition temperature of the initiator.

The polymerization is continued until the conversion degree of the vinyl aromatic compound in the polymerization mixture reaches a predetermined level, for example, at least 70 molar%, preferably at least 90 molar%.

The radical polymerization initiator usable for the polymerization can be selected from conventional initiators, for example, benzoyl peroxide, lauroyl peroxide, di-tert-butyl peroxide, cumene hydroperoxide, and azo-bis-isobutylnitrile.

The radical polymerization can be effected by a bulk, suspension or bulk-suspension polymerization method.

In the bulk polymerization, an internal lubricant, for example, liquid paraffin, is added in an amount of 0.1 to 5 parts by weight per 100 parts of the resultant copolymer to the polymerization mixture.

Where, after the polymerization is completed, the resultant product contains a small amount, usually 30% by weight or less, of non-reacted vinyl aromatic compound, it is preferable to eliminate the non-reacted vinyl aromatic compound from the resultant copolymer by a conventional method, for example, by removing it at an elevated temperature under a reduced pressure or by using an extruder with a device for eliminating a volatile substance from a polymer.

In the bulk polymerization procedure, if necessary, the polymerization mixture is stirred, but after the conversion degree of the vinyl aromatic compound reaches a predetermined level of at least 30%, the stirring operation is preferably stopped or restricted. Note, an excessive stirring will sometimes cause the resultant copolymer to exhibit a reduced mechanical strength.

If necessary, the bulk polymerization is carried out in the presence of a diluent, for example, toluene or ethylbenzene, and after the completion of the copolymerization, the diluent is removed together with the non-reacted monomer from the resultant product In the bulk-suspension polymerization method is useful for the process of the present invention. In this method, an initial step of the polymerization is carried out by a bulk polymerization method and the final step is effected by a suspension polymerization method.

In the initial step, the polymerization is carried out by the bulk polymerization method at an elevated temperature of, for example, from 20° C. to 200° C., in the absence of a catalyst. Otherwise, the initial step is effected by the bulk polymerization method in the presence of a catalyst or under radiation of actinic rays. In this initial step, the vinyl aromatic compound is partially copolymerized, usually at a conversion degree of 50% or less, preferably from 10% to 40%.

In the final step, the partially copolymerized product in the polymerization mixture is evenly suspended in an aqueous medium in the presence of a suspension stabilizer comprising, for example, carboxymethyl cellulose, polyvinyl alcohol, methyl cellulose or hydroxyethylcellulose, and/or a surfactant comprising, for example, sulfonated polystyrene, sodium dodecylbenzene sulfonate or polyethylene glycol, by stirring, and subjected to a suspension polymerization procedure. After the completion of the final stage, the resultant copolymer is separated from the polymerization mixture, washed, dried and, if necessary, pelletized or finely pulverized, and then put to practical use.

The radical polymerization method for the present invention is not limited to that specifically described above. That is, the radical polymerization procedure can be modified or improved in any manner as long as the objects of the present invention can be attained.

Where the polymerization is effected by an anionic polymerization method, a catalyst consisting of at least one member selected from lithium, sodium and potassium metals and organic compound of the above-mentioned metals is used. Preferably the catalyst comprises an organolithium compound alone or a mixture of the organic lithium compound with a polar compound.

The organolithium compound is preferably selected from ethyl lithium, n-propyl lithium, isopropyl lithium, n-butyl lithium, sec-butyl lithium, tert-butyl lithium, hexamethylene dilithium, butadienyl dilithium, and isoprenyl dilithium.

The polar compound is preferably selected from polar ether compounds, for example, tetrahydrofuran, diethyleneglycol dimethylether, and diethyleneglycol dibutylether; polar amine compounds, for example, triethyl amine and tetramethylethylene diamine; polar thioether compounds; polar phosphine compounds; polar phosphur amide compounds; alkylbenzene sulfonate compounds, and alkoxides of sodium and potassium.

The anionic polymerization procedure is carried out at a temperature of from 20° C. to 180° C., preferably from 50° C. to 150° C. After the completion of the polymerization, the resultant polymerized mixture is treated in the same manner as mentioned above to isolate the resultant vinyl aromatic compound high impact polymer material containing the conjugated diene compound prepolymer. A portion of the conjugated diene compound prepolymer is graft polymerized with the vinyl aromatic compound and the other portion of the prepolymer is evenly dispersed in a matrix consisting of the vinyl aromatic compound polymer and copolymer.

The vinyl aromatic compound high impact polymer material produced in accordance with the process of the present invention is useful for various shaped articles produced by an injection molding method or extrusion molding method. In particular, the high impact polymer material of the present invention is very useful for a low temperature injection molding method.

Before converting to a final use product, if necessary, the high impact polymer material of the present invention may be supplemented with a additive comprising at least one member selected from flame retardants, antioxidants, ultraviolet absorbers, lubricants, mold parting agents, fillers and other thermoplastic resins, for example, usual polystyrene and poly-methacrylate resins.

The specific high flame resistance of the high impact polymer material of the present invention can be exhibited by adding a flame retardant thereto.

In accordance with the process of the present invention, a conjugated diene compound prepolymer solution useful for the production of a vinyl aromatic compound high impact polymer material can be produced at a high efficiency without forming an undesirable gel-like polymeric substance. Also, the vinyl aromatic compound polymer material produced from the conjugated diene compound prepolymer solution exhibits an excellent impact resistance and a superior heat degradation resistance.

SPECIFIC EXAMPLES

The present invention will be further explained by way of specific examples, which, however, are representative and do not restrict the scope of the present invention in any way.

EXAMPLE 1

An autoclave having a capacity of 10 l and filled with dry nitrogen gas was charged with 100 g of 1,3-butadiene and 900 g of styrene, and thereafter with 0.3 m moles of neodymium phosphate of the formula:

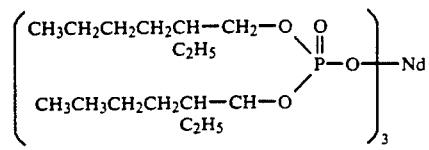

and with 1.5 m moles of di-isobutyl aluminum hydride, and after stirring the mixture at room temperature for 15 minutes, finally with 0.8 m moles of ethyl aluminum sesquichloride of the formula:

The mixture was heated at 80° C. for 2 hours to prepolymerize 1,3-butadiene. In the resultant prepolymer, the conversion degree of 1,3-butadiene was 87% and the degree of conversion of styrene was less than 1%, i.e., styrene was not substantially polymerized.

A portion of the butadiene prepolymer was subjected to a GPC measurement. The weight average molecular weight ($\overline{Mw}$) of the prepolymer was 250,000 and a heterogeneity $\overline{Mw}/\overline{Mn}$ was 2.6. As a result of a microstructure test by a $^1$H-NMR at 400 MHz, the content of 1,2-structure in the prepolymer was found to be 0.6% and the other portion of the prepolymer had a 1,4-structure.

The remaining 1,3-butadiene in an amount of 13 g was removed from the prepolymer solution by evaporation, to provide a butadiene prepolymer solution.

The butadiene prepolymer solution was mixed with 0.5 g of benzoyl peroxide, 80 g of ethylbenzene and 1.0 g of α-methylstyrene dimer, and the resultant polymerization mixture was subjected to a polymerization procedure at a temperature of 80° C. for 4 hours, at a temperature of 110° C. for 4 hours, and then at a temperature of 150° C. for 4 hours, while stirring the mixture. Thereafter, the polymerization mixture was further heat-treated at a temperature of 230° C. for 30 minutes. Then, the non-reacted styrene and ethylbenzene were removed from the resultant polymerized mixture under a vacuum.

The resultant product was a high impact styrene polymer material having a content of gel fraction of about 30% and a swelling index of about 10, and was in the form of fine particles having a size of about 2 μm.

The high impact styrene polymer material was finely pulverized, and then melted by an extruder and extruded into pellets.

The physical properties of the pellets were then measured.

The high impact styrene polymer material exhibited an Izot impact strength of 15.7 kg.cm/cm determined on a specimen having a notch in accordance with JIS K7110, and a flexural modulus of elasticity of 18,500 kg/cm² determined in accordance with ASTM D 790.

A portion of the pellets was heat treated in an oven at a temperature of 150° C. for 2 hours, and it was observed that no change in appearance and color of the pellets occurred. The heat treated polymer material exhibited an Izot impact strength of 15.5 kg.cm/cm, which was similar to that of the non-heat treated polymer material.

EXAMPLE 2

The same prepolymerization procedures as those described in Example 1 were carried out except that 80 g of ethylbenzene was added to the prepolymerization mixture before adding the catalytic components.

In the resultant prepolymer, the degree of conversion of 1,3-butadiene was 90% and substantially no styrene was polymerized, i.e., the degree of conversion of styrene was less than 1%. The resultant prepolymer had a weight average molecular weight $\overline{Mw}$ of 220,000 and a heterogeneity $\overline{Mw}/\overline{Mn}$ of 2.8.

It was confirmed by an $^1$H-NMR analysis that the prepolymer was substantially a high cis-polymer. Then, from the prepolymer solution, 10 g of the remaining 1,3-butadiene were removed.

The resultant prepolymer solution was subjected to the same polymerization procedures as those described in Example 1, except that ethylbenzene was not added to the polymerization mixture.

The resultant high impact styrene polymer material exhibited an Izot impact strength of 14.4 kg.cm/cm and a flexural modulus of elasticity of 18,000 kg/cm$^2$, determined in the same way as in Example 1.

EXAMPLE 3

The same prepolymerization procedures as those described in Example 2 were carried out except that the prepolymerization temperature and time were 70° C. and 6 hours, respectively.

In the resultant prepolymer, the degree of conversion of 1,3-butadiene was 99% or more and styrene was substantially not polymerized.

The resultant prepolymer had an $\overline{Mw}$ of 270,000 and a heterogeneity $\overline{Mw}/\overline{Mn}$ of 2.3, and it was confirmed by an infrared spectrophotometric analysis that the content of polymerized styrene in the prepolymer was 1.6%. Also, it was confirmed by an $^1$H-NMR analysis that the polymerized butadiene fraction had a high cis-structure.

The prepolymer solution was directly subjected to the same polymerization procedures as in Example 2 without removing the 1,3-butadiene remaining in the prepolymer solution.

The resultant high impact styrene polymer material exhibited an Izot impact strength of 16.1 kg.cm/cm and a flexural modulus of elasticity of 18,600 kg/cm$^2$.

EXAMPLE 4

A one liter autoclave in which air was replaced with a dry nitrogen gas was charged with 30 g of 1,3-butadiene, 70 g of styrene, and 30 g of hexane, then with 0.1 m mole of the same neodymium phosphate as mentioned in Example 1, 0.5 m moles of di-isobutylaluminum hydride, and, after stirring the mixture for 15 minutes, finally with 0.3 m moles of ethylaluminum sesquichloride. The prepolymerization mixture in the autoclave was heated at a temperature of 80° C. for one hour, while stirring the mixture.

In the resultant prepolymer, the degree of conversion of 1,3-butadiene was 75% and styrene was substantially not polymerized at a very low degree of conversion of less than 1%. 200 g of styrene and 1.0 m mole of n-butyl lithium were added to the prepolymer solution without eliminating the remaining 1,3-butadiene from the prepolymer solution.

The resultant polymerization mixture was subjected to the same polymerization procedures as described in Example 1 at a temperature of 80° C. for 2 hours.

The non-reacted styrene and hexane were removed from the polymerized mixture.

The resultant resin-like high impact styrene polymer material exhibited an Izot impact strength of 13.4 kg.cm/cm and a flexural modulus of elasticity of 15,300 kg/cm$^2$.

EXAMPLE 5

The same procedures as described in Example 4 were carried out except that, in the preparation of the catalyst, 0.1 m mole of the same neodymium phosphate as described in Example 1 was mixed with 0.5 m moles of di-isobutyl aluminum hydride in styrene, the mixture was subjected to a preliminary reaction at room temperature for 15 minutes while stirring, then the mixture was admixed with 0.3 m moles of ethyl aluminum sesquichloride and 7 m moles of 1,3-butadiene, and the resultant admixture was aged at room temperature for 3 hours.

The resultant prepolymer had a degree of conversion of 1,3-butadiene of 88%.

In view of the fact that, since the degree of conversion of 1,3-butadiene was 75% in the prepolymer mentioned in Example 4, the preliminary reaction of the neodymium phosphate with the organo aluminum compound contributes to an increase in the degree of conversion of 1,3-butadiene in the prepolymerization procedures.

EXAMPLE 6

The same prepolymerization procedures as described in Example 1 were carried out except that the autoclave was charged with 60 g of 1,3-butadiene, 40 g of styrene and 80 g of hexane and then with a catalyst consisting of 0.2 m moles of barium nonylphenoxide, 0.3 m moles of diethyl magnesium, 0.3 m mols of n-butyl lithium, and 0.4 m moles of triethylaluminum, and the prepolymerization mixture was heated at a temperature of 80° C. for 3 hours.

In the resultant prepolymer, the degree of conversion of 1,3-butadiene was 83%, whereas the degree of conversion of styrene was 5%.

The prepolymer had a content of polymerized styrene of 3.8% by weight, a $\overline{Mw}$ of 12,000 and an $\overline{Mw}/\overline{Mn}$ of 1.6.

The remaining 1,3-butadiene was removed from the resultant prepolymer solution in an amount of 10.2 g, by degasification, 200 g of styrene and 20 g of ethylbenzene were added to the prepolymer solution, and the resultant polymerization mixture was subjected to the same polymerization procedures as described in Example 1.

The resultant high impact styrene polymer material exhibited an excellent Izot impact strength of 10.7 kg.cm/cm.

EXAMPLE 7

The same prepolymerization procedures as described in Example 6 were carried out except that triethyl aluminum was not used. In the resultant prepolymer, the degree of conversion of 1,3-butadiene was 87%, whereas the degree of conversion of styrene was 6%.

The resultant prepolymer had a content of polymerized styrene of 4.6% by weight, an $\overline{Mw}$ of 13,000, and an $\overline{Mw}/\overline{Mn}$ of 1.6.

The remaining 1,3-butadiene was removed from the prepolymer solution by degasification, and the resultant prepolymer solution was mixed with 200 g of styrene and 20 g of ethylbenzene.

The resultant mixture was subjected to the same polymerization procedures as described in Example 6, and the resultant styrene polymer material had an excellent impact resistance.

EXAMPLE 8

The same procedures as described in Example 4 were carried out except that the catalyst consisted of 0.03 m mole of lantharum versaticate and 0.2 m mole of diethylmagnesium. After the prepolymerization procedures at a temperature of 80° C. for 2 hours, the degree of conversion of 1,3-butadiene reached 91%. 100 g of styrene and then 2 m molds of n-butyl lithium were added to the prepolymerization mixture, and the prepolymerization procedures for the mixture further cautioned with the prepolymerization was completed.

The resultant styrene polymer material had an excellent impact resistance.

COMPARATIVE EXAMPLE 1

The same procedures as those described in Example 2 of Japanese Unexamined Patent Publication No. 57-149316 (corresponding to U.S. Pat. No. 4,311,819. That is, in the prepolymerization procedures, the same autoclave as mentioned in Example 1 was charged with 550 g of 1,3-butadiene and 450 g of styrene, and then with 5 m moles of n-butyl lithium, and the mixture in the autoclave was heated at a temperature of 50° C. for 110 minutes.

In the resultant compositive prepolymer, the degree of conversion of 1,3-butadiene was a low level of 22%.

The resultant butadiene-styrene copolymer contained 8.2% by weight of polymerized styrene.

The resultant prepolymer solution in the autoclave was further heated by the heating jacket located on the periphery of the autoclave at a temperature of 50° C. for 3 hours, under a reduced pressure, to separate and remove the non-reacted 1,3-butadiene in an amount of 425 g. The prepolymer solution was admixed with 500 g of styrene and the resultant mixture was subjected to the same polymerization procedures as described in Example 1.

The resultant styrene polymer material had an Izot impact strength of 8.3 kg·cm/cm and a flexural modulus of elasticity of 16,700 kg/cm$^2$.

COMPARATIVE EXAMPLE 2

The same procedures as described in Run No. 3, Example 3 of the Japanese Unexamined Patent Publication No. 57-149,316 (corresponding to U.S. Pat. No. 4,311,819, were carried out by using the same autoclave as mentioned in Example 4. Namely, 35 g of 1,3-butadiene and 65 g of styrene were polymerized in 100 g of toluene in the presence of 0.035 g of n-butyl lithium. After the polymerization procedures at a temperature of 40° C. for one hour, the degree of conversion of 1,3-butadiene reached 25%. The resultant butadiene polymer contained 18% of polymerized styrene.

COMPARATIVE EXAMPLE 3

The same procedures as described in Example 1 of Japanese Examined Patent Publication No. 41-6917 (corresponding to U.S. Pat. No. 3,299,178 were carried out by using the same autoclave as mentioned in Example 1. Namely, the autoclave was charged with 100 g of 1,3-butadiene and 900 g of styrene, and then successively, with 4.8 m moles of tri-isobutyl aluminum, 0.7 m moles of iodine, and 0.4 m moles of titanium tetrachloride. The mixture in the autoclave was polymerized at a temperature of 30° C. for 4 hours.

In the resultant polymer, the degree of conversion of 1,3-butadiene was 35% and styrene was not polymerized.

The non-reacted 1,3-butadiene was removed from the polymer solution.

The remaining polymer solution was subjected to the polymerization procedures as described in Example 1, and a styrene polymer material was obtained.

The resultant colorless styrene polymer material exhibited an unsatisfactory Izot impact strength of 4.6 kg·cm/cm and a flexural modulus of elasticity of 17,300 kg/cm$^2$.

After heating in an oven at a temperature of 150° C. for 2 hours, the polymer material was discolored brown and exhibited a remarkably reduced Izot impact strength of 2.1 kg·cm/cm.

COMPARATIVE EXAMPLE 4

Polymerization procedures similar to those described in Comparative Example 3 were carried out with reference to experiments disclosed in U.S. Pat. No. 4,575,538. Namely, a reaction vessel was charged with 100 g of 1,3-butadiene and 900 g of styrene, and then with 1.2 m moles of a catalyst which was prepared from one molar parts of neodymium trichloride and 3 molar parts of 1,2-hexadecane diol, and with 30 m moles of tri-isobutyl aluminum, and the mixture was polymerized at a temperature of 50° C. for 4 hours. In the resultant polymer, the degree of conversion of 1,3-butadiene was 44% and substantially no styrene was polymerized. The resultant polymer contained a large amount of a gel-like substance which was insoluble in toluene.

The non-reacted 1,3-butadiene was removed from the polymer solution, and the remaining polymer solution was subjected to the same polymerization procedures as described in Example 1 to provide a styrene polymer material.

The styrene polymer material exhibited a poor Izot impact strength of 3.2 kg·cm/cm and a flexural modulus of elasticity of 18,000 kg/cm$^2$.

When heated at a temperature of 150° C. for 2 hours, the heated polymer material was discolored known and exhibited a remarkably reduced Izot impact strength of 2.3 kg·cm/cm.

Examples 1 to 8 and Comparative Examples 1 to 4 presented above clearly indicate that the process of the present invention is advantageous over the conventional processes in that the conjugated diene compound prepolymer contains a very small amount of or substantially no vinyl aromatic compound copolymerized with the conjugated diene compound. This advantage is clearly illustrated by Examples 1 to 4. The solution of the conjugated diene compound prepolymer, which is substantially free from polymerized vinyl aromatic compound in the vinyl aromatic compound, is very useful for the production of a vinyl aromatic compound high impact polymer material.

The process of the present invention is also advantageous in that the amount of the non-reacted conjugated diene compound to be removed from the resultant prepolymer solution is small or substantially zero, and the removal of the non-reacted conjugated diene compound is easy. In Examples 3 and 4, the amount of the non-reacted 1,3-butadiene was very small, and thus the removal of the non-reacted 1,3-butadiene was practically unnecessary.

The above-mentioned advantages show that the process of the present invention can be easily carried out with an enhanced efficiency at a low cost.

Also, the prepolymer solution produced by the process of the present invention is useful for producing a vinyl aromatic compound high impact polymer material having an excellent impact resistance and a superior heat degradation resistance.

We claim:

1. A prepolymerization process for producing a conjugated diene compound prepolymer solution useful for the production of a vinyl aromatic compound high impact polymer material, comprising the steps of:

preparing a prepolymerization mixture comprising 1 to 70 parts by weight of at least one conjugated diene compound and 30 to 99 parts by weight of at least one vinyl aromatic compound; and subjecting the prepolymerization mixture to prepolymerization at a temperature of 0° C. to 150° C. in the presence of a prepolymerization catalyst (A) consisting essentially of:

mixtures of a component (a) consisting of at least one member selected from the group consisting of organic and inorganic phosphates and of rare earth elements, with a component (b) consisting of at least one organic aluminum compound and a component (c) consisting of at least one Lewis acid, said catalyst causing the conjugated diene compound to be selectively polymerized but is substantially not effective in the polymerization of the vinyl aromatic compound, such that the conjugated diene compound and the vinyl aromatic compound are prepolymerized at degrees of conversion of at least 70 molar % and 10 molar % or less, respectively.

2. The prepolymerization process as claimed in claim 1, wherein, in component (a) of prepolymerization catalyst (A), the rare earth element is selected from the group consisting of cerium, lanthanum, praseodymium, neodymium and gadolinium.

3. The prepolymerization process as claimed in claim 1, wherein the component (b) of prepolymerization catalyst (A) consists of at least one organic aluminum compound represented by the general formula (I):

$$Al\ R_{3-n}H_n \qquad (I)$$

wherein n represents 0, 1 or 2 and R represents a hydrocarbon radical having 1 to 8 carbon atoms.

4. The prepolymerization process as claimed in claim 1, wherein the Lewis acid in the component (c) of prepolymerization catalyst (A) is a halogen-containing Lewis acid.

5. The prepolymerization process as claimed in claim 4, wherein prepolymerization catalyst (A) has a molar ratio of the component (c) in terms of halogen to the component (a) in terms of the rare earth element, of 2:1 to 6:1.

6. The prepolymerization process as claimed in claim 1, wherein prepolymerization catalyst (A) consists essentially of a mixture of a reaction product of the component (a) with the component (b), with the component (c).

7. The prepolymerization process as claimed in claim 1, wherein prepolymerization catalyst (A) is present in an amount of $0.5 \times 10^{-3}$ moles or less in terms of the rare earth element per 100 g of the conjugated diene compound.

8. The prepolymerization process as claimed in claim 1, wherein in prepolymerization catalyst (A), the components (b) and (c) are present in amounts of 2 to 100 molar parts in terms of aluminum and 2 to 6 molar parts in terms of the halogen element, respectively, per one molar part in terms of the rare earth element, of the component (a).

9. The prepolymerization process as claimed in claim 6, wherein the reaction product of the component (a) with the component (b) was prepared at a reaction temperature of 0° C. to 100° C.

10. The prepolymerization process as claimed in claim 1, wherein the component (a) is reacted with the component (b) and the resultant reaction product is aged in the presence of the conjugated diene compound at a temperature of from 0° C. to 100° C., before the prepolymerization procedure.

11. The prepolymerization process as claimed in claim 1, wherein the mixture of prepolymerization catalyst (A) further includes a medium of at least one inert solvent.

12. The prepolymerization process as claimed in claim 11, wherein the inert solvent is selected from the group consisting of liquid aliphatic hydrocarbons, cycloaliphatic hydrocarbons and aromatic hydrocarbons.

13. The prepolymerization process as claimed in claim 11, wherein the inert solvent medium is present in an amount of 200 parts by weight or less per 100 parts by weight of the total amount of the conjugated diene compound and the vinyl aromatic compound.

14. The prepolymerization process as claimed in claim 1, wherein the conjugated diene compound is selected from the group consisting of 1,3-butadiene, 2-methyl-1,3-butadiene, 2,3-dimethyl-1,3-butadiene, 1,3-pentadiene and 1,3-hexadiene.

15. The prepolymerization process as claimed in claim 1, wherein the vinyl aromatic compound is selected from the group consisting of styrene, o-methylstyrene, p-methylstyrene, p-tert-butylstyrene, 1,3-dimethylstyrene, α-methylstyrene, vinylnaphthalene and vinylanthracene.

16. A process for producing a vinyl aromatic compound high impact polymer material, comprising the steps of:

preparing a prepolymerization mixture comprising 1 to 70 parts by weight of at least one conjugated diene compound and 30 to 99 parts by weight of at least one vinyl aromatic compound;

subjecting the prepolymerization mixture to prepolymerization at a temperature of 0° C. to 150° C. in the presence of a prepolymerization catalyst (A) consisting essentially of:

mixtures of a component (a) consisting of at least one member selected from the group consisting of organic and inorganic phosphates and phosphites of rare earth elements, with a component (b) consisting of at least one organic aluminum compound and a component (c) consisting of at least one Lewis acid, said catalyst causing the conjugated diene compound to be selectively polymerized but is substantially not effective in the polymerization of the vinyl aromatic compound, such that the conjugated diene compound and the vinyl aromatic compound are prepolymerized to degrees of conversion of at least 70 molar % and 10 molar % or less, respectively, resulting in forming a conjugated diene compound prepolymer solution; and further subjecting the resultant prepolymer solution to a polymerization procedure in which the remaining vinyl aromatic compound in the solution is polymerized with the conjugated diene compound prepolymer.

17. The process as claimed in claim 16, wherein the polymerization is carried out by a radical polymerization method.

18. The process as claimed in claim 17, wherein the radical polymerization is non-catalytically carried out by the radical polymerization method at a temperature of 50° C. to 250° C.

19. The process as claimed in claim 17, wherein the polymerization is carried out by the radical polymerization method in the presence of a radical polymerization initiator at a temperature of 20° C. to 200° C.

20. The process as claimed in claim 17, wherein the radical polymerization is carried out by a bulk polymerization method.

21. The process as claimed in claim 17, wherein the radical polymerization is carried out by a bulk-suspension polymerization method in which the vinyl aromatic compound is polymerized by the bulk polymerization method until the degree of conversion of the vinyl aromatic compound reaches a level of 5 to 50 molar% and then by the suspension polymerization method in the presence of a suspension stabilizer.

22. The process as claimed in claim 16, wherein the polymerization is carried out by a catalytical anionic polymerization method at a temperature of 20° C. to 180° C.

* * * * *